(12) United States Patent
Nam et al.

(10) Patent No.: US 11,072,880 B2
(45) Date of Patent: Jul. 27, 2021

(54) DRIVING DEVICE OF WASHING MACHINE

(71) Applicant: LG Electronics Inc., Seoul (KR)

(72) Inventors: Hyoung Uk Nam, Seoul (KR); Seung-Suk Oh, Seoul (KR); Jin Hong, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 15/930,796

(22) Filed: May 13, 2020

(65) Prior Publication Data

US 2020/0362499 A1    Nov. 19, 2020

(30) Foreign Application Priority Data

May 13, 2019    (KR) .......................... 10-2019-0055940

(51) Int. Cl.

| | |
|---|---|
| *F16H 1/46* | (2006.01) |
| *B60K 17/16* | (2006.01) |
| *D06F 37/36* | (2006.01) |
| *D06F 23/02* | (2006.01) |
| *D06F 37/20* | (2006.01) |
| *F16H 1/28* | (2006.01) |
| *F16H 57/02* | (2012.01) |

(52) U.S. Cl.
CPC .............. *D06F 37/36* (2013.01); *D06F 23/02* (2013.01); *D06F 37/206* (2013.01); *F16H 1/28* (2013.01); *F16H 57/02* (2013.01); *F16H 2057/02039* (2013.01)

(58) Field of Classification Search
CPC ........ D06F 37/30–40; F16H 1/28; F16H 3/54; F16H 57/02; F16H 3/44; F16H 2200/2005; F16H 2200/2033; F16H 2200/0035

USPC ........................................................ 68/12.24
See application file for complete search history.

(56) References Cited

U.S. PATENT DOCUMENTS

| | | | |
|---|---|---|---|
| 4,232,536 A | 11/1980 | Koseki et al. | |
| 9,725,840 B2* | 8/2017 | Choi .................. | D06F 23/04 |
| 2002/0007653 A1* | 1/2002 | Koshiga ............. | D06F 37/304 |
| | | | 68/23.7 |

(Continued)

FOREIGN PATENT DOCUMENTS

| | | |
|---|---|---|
| CN | 108457047 | 8/2018 |
| EP | 1439255 | 7/2004 |

(Continued)

OTHER PUBLICATIONS

Extended European Search Report in European Appln. No. 20174010.7, dated Jul. 28, 2020, 10 pages.

*Primary Examiner* — Charles A Fox
*Assistant Examiner* — Farhana Pervin
(74) *Attorney, Agent, or Firm* — Fish & Richardson P.C.

(57) ABSTRACT

A driving device for a washing machine includes a motor comprising a stator and a rotor configured to rotate inside the stator, a shaft configured to receive torque of the motor and rotate an inner tub of the washing machine, a planetary gear located at a front end of the shaft and configured to adjust a rotation speed of the inner tub by changing the torque of the motor at a preset reduction gear ratio, and an electronic clutch located between the shaft and the planetary gear and configured to operate to adjust connection and disconnection between the shaft and the planetary gear according to an operation mode change signal of the washing machine.

8 Claims, 3 Drawing Sheets

(56) References Cited

U.S. PATENT DOCUMENTS

| | | | |
|---|---|---|---|
| 2006/0010612 A1* | 1/2006 | Kim | D06F 37/40 8/158 |
| 2008/0042510 A1* | 2/2008 | Park | H02K 3/28 310/216.004 |
| 2013/0036773 A1* | 2/2013 | Choi | D06F 23/04 68/140 |
| 2018/0371670 A1* | 12/2018 | Tanikoshi | D06F 37/06 |
| 2019/0161901 A1* | 5/2019 | An | F16H 1/28 |

FOREIGN PATENT DOCUMENTS

| | | |
|---|---|---|
| GB | 1047815 | 11/1966 |
| GB | 2009520 | 6/1979 |
| KR | 1999003118 | 5/1999 |
| WO | WO2016122170 | 8/2016 |

* cited by examiner

DRIVING DEVICE OF WASHING MACHINE

CROSS-REFERENCE TO RELATED APPLICATION

This application claims priority to and the benefit of Korean Patent Application No. 10-2019-0055940, filed on May 13, 2019, the disclosure of which is incorporated herein by reference in its entirety.

BACKGROUND

1. Field

The present disclosure relates to a driving device of a washing machine.

2. Discussion of Related Art

A motor of a washing machine has different operation conditions for washing and spin-drying.

In washing, the motor operates at a low speed with high torque. Also, in spin-drying, the motor operates at a high speed with low torque.

For example, a spin-drying speed is set to be twenty-five times higher than a washing speed.

Accordingly, since a motor of a general washing machine (for example, a direct drive (DD) motor) has low efficiency in washing and high efficiency in spin-drying, there are disadvantages of inconvenience in overall washing operations and high energy consumption.

Accordingly, in the case of a method of increasing efficiencies of both washing and spin-drying, power consumption of a washing machine may be decreased and an energy rating may be increased.

However, since there is no method of increasing both efficiencies of low speed and high speed due to properties of a motor, a technical solution for overcoming the same is necessary.

Some speed reduction devices of washing machines are configured such that upper and lower covers are pressed against a top and bottom of a sun gear and has advantages of preventing vertical movement caused by an impellent force and reducing noise caused by the impellent force.

However, such speed reduction devices do not provide a technical solution for increasing both motor efficiencies during washing and spin-drying, that is, a low speed operation and a high speed operation.

SUMMARY

The present disclosure is directed to a driving device of a washing machine using a planetary gear and an electronic clutch.

The present disclosure is also directed to a driving device of a washing machine that allows a high speed and low torque operation mode and a low speed and high torque operation mode necessary for spin-drying and washing respectively through on/off operations of an electronic clutch to be selectively implemented while maintaining a driving speed of a motor at the same speed so as to reduce energy consumption.

Aspects of the present disclosure are not limited to the above-stated aspects and other unstated purposes and advantages of the present disclosure will be understood by the following description and will be more clearly understood by the embodiments of the present disclosure. Also, it will be easily understood that the aspects and advantages of the present disclosure can be implemented by components and a combination thereof shown in the claims.

Particular implementations described herein include a driving device of a washing machine. The driving device includes a motor, a shaft, a planetary gear, and an electronic clutch. The motor may include a stator and a rotor at least partially surrounded by the stator. The shaft may be coupled to the motor and configured to rotate an inner tub of the washing machine. The planetary gear may be connected to the shaft and configured to change a torque of the motor and adjust a rotation speed of the inner tub according to a preset reduction gear ratio. The electronic clutch may be located between the shaft and the planetary gear and configured to selectively couple the shaft with the planetary gear based on an operation mode of the washing machine.

In some implementations, the driving device can optionally include one or more of the following features. The shaft may be configured, based on the electronic clutch being turned on, to be connected to the inner tub without the planetary gear being coupled with the shaft. The driving device may be configured to operate based on the operation mode of the washing machine. The operation mode may include a high speed and low torque operation mode in which the inner tub rotates at a first rotational speed with a first torque, and a low speed and high torque operation mode in which the inner tub rotates at a second rotational speed with a second torque. The second rotational speed may be lower than the first rotational speed, and the second torque may be higher than the first torque. The inner tub may be configured, based on the electronic clutch being turned on, to operate in the high speed and low torque operation mode based on a rotation speed of the motor. The shaft may be configured, based on the electronic clutch being turned off, to be connected to the planetary gear. The driving device may be configured to operate based on the operation mode of the washing machine. The operation mode may include a high speed and low torque operation mode in which the inner tub rotates at a first rotational speed with a first torque, and a low speed and high torque operation mode in which the inner tub rotates at a second rotational speed with a second torque. The second rotational speed may be lower than the first rotational speed, and the second torque may be higher than the first torque. The inner tub may be configured, based on the electronic clutch being turned off, to operate in the low speed and high torque operation mode based on a rotation speed of the motor changed with the preset reduction gear ratio of the planetary gear. The driving device may include a frame defining a space for mounting the motor. The shaft may extend through a center of the frame and be connected to the planetary gear. The stator may be disposed at an end of the space in the frame. The driving device may include an insulator that mounts the stator, and a support extending from the insulator toward the shaft, and supporting the electronic clutch. The driving device may include a sun gear coupled to an end of the shaft, and a gear housing located at the end of the shaft and receiving the planetary gear and the sun gear. An end of the gear housing may be located to face the inner tub. An opposite end of the gear housing may be disposed to face the support. The gear housing may be fixed to the insulator.

Particular implementations described herein include a driving device of a washing machine. The driving device includes a motor, a shaft, a planetary gear, and an electronic clutch. The motor may include a stator and a rotor at least partially surrounded by the stator. The shaft may be coupled to the motor and configured to rotate an inner tub of the washing machine. The planetary gear may be connected to the shaft and configured to change a torque of the motor and adjust a rotation speed of the inner tub according to a preset reduction gear ratio. The electronic clutch may be located between the shaft and the planetary gear and configured to selectively couple the shaft with the planetary gear based on an operation mode of the washing machine. The operation mode may include a high speed and low torque operation mode in which the inner tub rotates at a first rotational speed with a first torque, and a low speed and high torque operation mode in which the inner tub rotates at a second rotational speed with a second torque. The second rotational speed may be lower than the first rotational speed, and the second torque may be higher than the first torque. The electronic clutch may be selectively turned on or off to operate the high speed and low torque operation mode or the low speed and high torque operation mode based on the motor rotating at a constant speed.

In some implementations, the driving device can optionally include one or more of the following features. The shaft may be configured, based on the electronic clutch being turned on, to be connected to the inner tub without the planetary gear being coupled between the shaft and the inner tub, such that the inner tub operates in the high speed and low torque operation mode corresponding to a rotation speed of the motor. The shaft may be configured, based on the electronic clutch being turned off, to be connected to the planetary gear, such that the inner tub operates in the low speed and high torque operation mode based on a rotation speed of the motor changed with the preset reduction gear ratio through the planetary gear. The driving device may include a frame defining a space for mounting the motor. The shaft may extend through a center of the frame and be connected to the planetary gear. The stator may be disposed at an end of the space in the frame. The driving device may include an insulator that mounts the stator, and a support extending from an insulator toward the shaft and supporting the electronic clutch. The driving device may include a sun gear coupled to an end of the shaft, and a gear housing located at the end of the shaft and receiving the planetary gear and the sun gear. An end of the gear housing may be located to face the inner tub, and an opposite end of the gear housing may be disposed to face the support. The gear housing may be fixed to the insulator.

According to an aspect of the present disclosure, there is provided a driving device of a washing machine that allows a high speed and low torque operation and a low speed and high torque operation necessary for spin-drying and washing to be implemented while a rotation speed of a motor of the washing machine may be uniform using a planetary gear and an electronic clutch.

The driving device may include a motor, a shaft, a planetary gear, and an electronic clutch.

The motor may include a stator and a rotor configured to rotate inside the stator.

The shaft may receive torque of the motor and rotate an inner tub of the washing machine.

The planetary gear may be located at a front end of the shaft.

The planetary gear may adjust a rotation speed of the inner tub by changing torque of the motor at a preset reduction gear ratio.

The electronic clutch may be located between the shaft and the planetary gear.

The electronic clutch may operate to adjust connection and disconnection between the shaft and the planetary gear according to an operation mode change signal of the washing machine.

When the electronic clutch is turned on, the shaft may be directly connected to the inner tub without being connected through the planetary gear. The inner tub may operate in a high speed and low torque operation mode corresponding to a rotation speed of the motor.

When the electronic clutch is turned off, the shaft may be connected to the planetary gear. The inner tub may operate in a low speed and high torque operation mode corresponding to a rotation speed of the motor changed at the preset reduction gear ratio through the planetary gear.

The driving device may further include a frame in which an accommodation space is secured to mount the motor therein. The shaft may pass through a center of the frame and be connected to the planetary gear.

The stator may be disposed along an edge of the accommodation space inside the frame in a circumferential direction.

The electronic clutch may be supported by a support formed to extend and protrude from an insulator, which fixes the stator, toward the shaft.

The planetary gear may be accommodated with a sun gear coupled to the front end of the shaft in a gear housing located at the front end of the shaft.

A front end of the gear housing may be located to be adjacent to the inner tub, and a rear end of the gear housing may be disposed to face the support.

The gear housing may be connected to the insulator and a position thereof may be fixed.

The motor may rotate at the same rotation speed during spin-drying and washing of the washing machine. A high speed and low torque operation mode, necessary for spin-drying of the washing machine, and a low speed and high torque operation mode, necessary for washing of the washing machine, may be selectively adjusted by adjusting on/off operations of the electronic clutch. As described above, efficiency of an operation area of the motor may be increased by maintaining a uniform operation speed of the motor. Consequently, electrical energy consumption may be reduced.

BRIEF DESCRIPTION OF THE DRAWINGS

The above and other objects, features and advantages of the present disclosure will become more apparent to those of ordinary skill in the art by describing exemplary embodiments thereof in detail with reference to the accompanying drawings, in which.

DETAILED DESCRIPTION OF EXEMPLARY EMBODIMENTS

Hereinafter, embodiments of the present disclosure will be described in detail to be implemented by one of ordinary skill in the art with reference to the drawings. The present disclosure may be implemented in a variety of shapes and will not be limited to the embodiments described herein.

To clearly describe the present disclosure, a description of an irrelevant part will be omitted. Throughout the specification, like or similar components will be referred to as like reference numerals. Also, some embodiments of the present disclosure will be described in detail with reference to exemplary drawings. While reference numerals are given to components of each drawing, it should be noted that although shown in different drawings, like components will be referred to as like reference numerals if possible. Also, in a description of the embodiments of the present disclosure, a detailed description of well-known components or functions of the related art will be omitted when it is deemed to obscure understanding of the embodiments of the present disclosure.

In a description of components of the present disclosure, when it is stated that a component is "connected," "coupled," or "joined" to another component, it should be understood that the component may be directly connected or joined to the other component or may be "connected," "coupled," or "joined" to the other component with another component "interposed" between the components.

Figure 1:
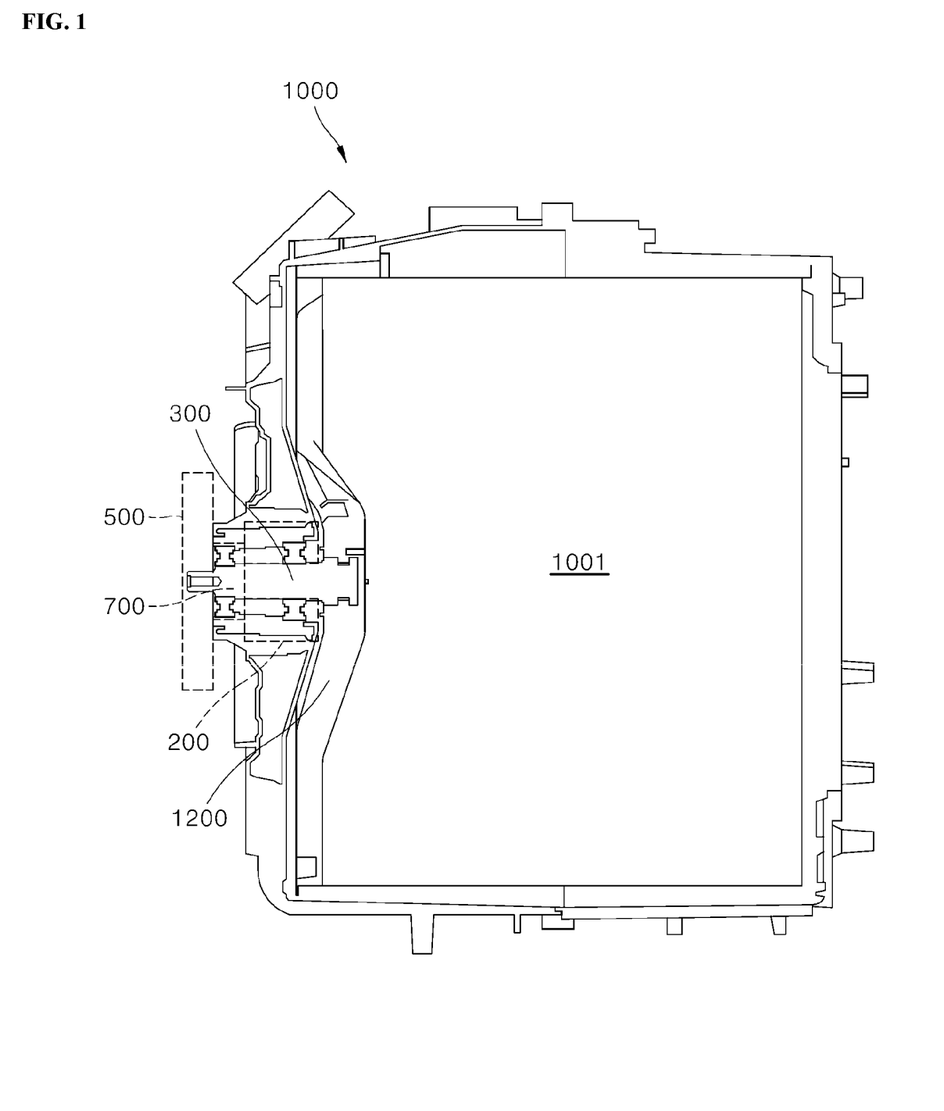
FIG. 1 is a schematic diagram briefly illustrating a washing machine to which a driving device of a washing machine according to embodiments of the present disclosure is applicable.
Figure 2:
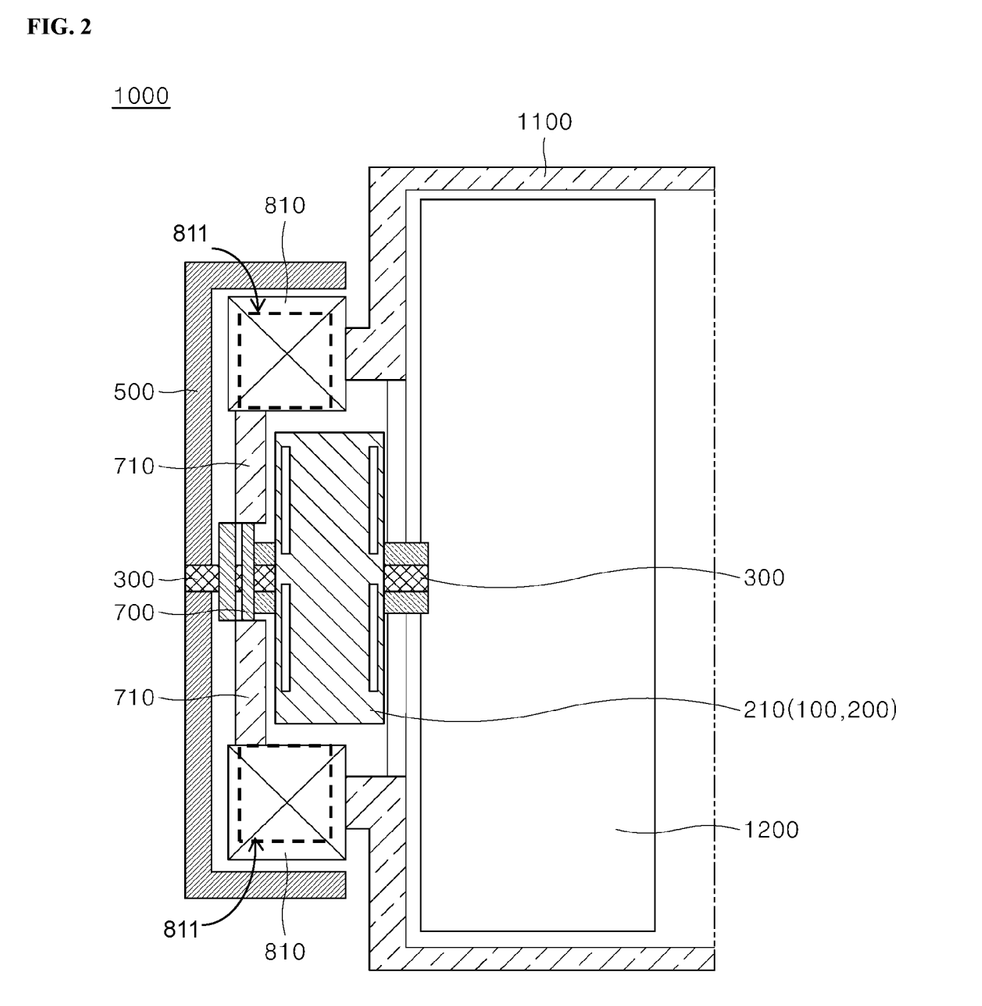
FIG. 2 is a cross-sectional view briefly illustrating the driving device of the washing machine according to embodiments of the present disclosure.
Figure 3:
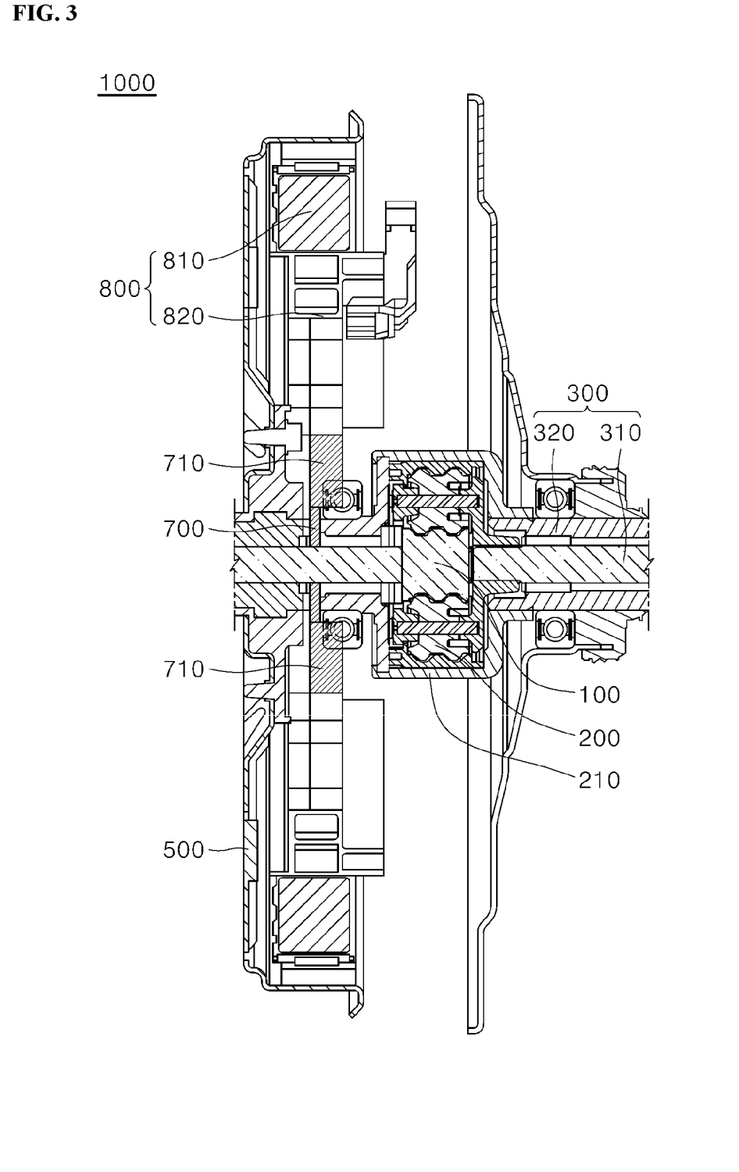
FIG. 3 is an enlarged cross-sectional view illustrating only the driving device of the washing machine shown in FIG. 1.

FIG. 1 is a schematic diagram briefly illustrating a washing machine to which a driving device of a washing machine according to embodiments of the present disclosure is applicable, FIG. 2 is a cross-sectional view briefly illustrating the driving device of the washing machine according to embodiments of the present disclosure, and FIG. 3 is an enlarged cross-sectional view illustrating only the driving device of the washing machine shown in FIG. 1.

A driving device of a washing machine 1000 according to an embodiment of the present disclosure includes a motor 800, a shaft 300, a planetary gear 200, and an electronic clutch 700.

The motor 800 includes a stator 810 and a rotor 820 (refer to FIG. 3) configured to rotate inside the stator 810.

The shaft 300 receives torque of the motor 800 and rotates an inner tub 1200 of the washing machine 1000.

Referring to FIG. 1, the washing machine 1000 according to the embodiment of the present disclosure may have a structure without a pulsator and be configured such that only the inner tub 1200 disposed inside an outer tub 1100 (refer to FIG. 2) may operate.

Accordingly, the shaft 300 is configured to receive torque of the motor 800 and to rotate the inner tub 1200 while directly rotating the inner tub 1200 or rotating the inner tub 1200 with a rotating speed changed at a preset reduction gear ratio.

A certain accommodation space 1001 may be provided inside the inner tub 1200.

When a front door of the washing machine 1000 is opened, inserted laundry may be accommodated in the accommodation space 1001 inside the inner tub 1200 and a washing or spin-drying operation may be performed.

The planetary gear 200 may be located at a front end of the shaft 300.

As shown in FIGS. 2 and 3, the planetary gear 200 may be disposed to be adjacent to the inner tub 1200 through the front end of the shaft 300 and a front part of the shaft 300.

The planetary gear 200 may change torque of the motor 800 at a preset reduction gear ratio.

The planetary gear 200 changes the rate of torque of the motor 800 transferred from the shaft 300 at the preset reduction gear ratio and adjusts a rotation speed of the inner tub 1200.

Accordingly, the inner tub 1200 may rotate in a low speed and high torque operation mode using the planetary gear 200 without changing the rotation speed of the motor 800 to be a low speed.

The electronic clutch 700 may be located between the shaft 300 and the planetary gear 200.

The electronic clutch 700 refers to a device configured to adjust gear connection and disconnection between the shaft 300 and the planetary gear 200.

In detail, the electronic clutch 700 adjusts an operation of connecting the shaft 300 and the planetary gear 200 or releasing a connection state thereof according to an operation mode change signal of the washing machine 1000.

For example, referring to FIG. 2, when the electronic clutch 700 is turned on in the driving device of the washing machine 1000, the shaft 300 is directly connected to the inner tub 1200 without being connected through the planetary gear 200.

Accordingly, the inner tub 1200 may operate in a high speed and low torque operation mode corresponding to the rotation speed of the motor.

That is, in the case in which the rotation speed of the motor is uniformly set at a speed of 500 RPM, when the electronic clutch 700 is turned on, the inner tub 1200 operates in the high speed and low torque operation mode at the speed of 500 RPM corresponding to the rotation speed of the motor.

Accordingly, a spin-drying operation, which requires an operation of the high speed and low torque operation mode, may be smoothly performed.

On the other hand, in the driving device of the washing machine 1000, when the electronic clutch 700 is turned off, the shaft 300 is connected to the planetary gear 200.

Accordingly, the inner tub 1200 receives torque of the motor changed at the preset reduction gear ratio through the planetary gear 200 so as to operate in a low speed and high torque operation mode.

That is, even when the rotation speed of the motor is uniformly set at 500 RPM like the spin-drying, the inner tub 1200 receives a reduced low speed and high torque force from the planetary gear 200 due to an off operation of the electronic clutch 700.

Accordingly, even in washing, like the spin-drying operation, the washing operation, which needs an operation of the low speed and high torque operation mode, may be smoothly performed without changing the rotation speed of the motor.

As described above, in the case of the driving device of the washing machine 1000 according to the embodiment of the present disclosure, the motor 800 (refer to FIG. 3) rotates at the same rotation speed during spin-drying and washing of the washing machine 1000.

The high speed and low torque operation mode of the inner tub 1200 necessary for spin-drying of the washing machine 1000 may be performed by only adjusting the on/off operations of the electronic clutch 700, and the low speed and high torque operation mode necessary for washing may also be easily selected.

Since an operation speed of the motor may be always maintained to be uniform at the same time as described above, efficiency of a motor operation area may be increased such that electrical energy consumption may be reduced.

The driving device of the washing machine according to the embodiment of the present disclosure will be described in detail with reference to FIGS. 2 and 3.

The driving device of the washing machine 1000 according to the embodiment of the present disclosure further includes a frame 500.

The frame 500 refers to a stiff member with an accommodation space thereinside so as to mount the motor 800.

However, the frame 500 is not limited to an illustrated shape. In other words, one among shapes which may accommodate and shield a plurality of electrical or electronic components including the stator 810 and the rotor 820 (refer to FIG. 3) included in the motor 800 (refer to FIG. 3) from the outside, which is well known to those skilled in the art, may be used without restriction.

The shaft 300 passes through a center of the frame 500, and the planetary gear 200 may be connected to the front end of the shaft 300.

The front end of the shaft 300 may have a structure in which an inner shaft 310 and an outer shaft 320 are coupled.

The inner shaft 310 is a shaft connected to the motor 800 and may rotate separately from the outer shaft 320. The outer shaft 320 may be configured to be connected to the planetary gear 200 and transfer torque with a speed changed according to the reduction gear ratio of the planetary gear 200 when the electronic clutch 700 is turned on.

As shown in FIG. 3, the planetary gear 200 may be gear-coupled to the sun gear 100 coupled to the front end of the shaft 300, that is, to the inner shaft 310 in a gear housing 210. The planetary gear 200 may be coupled to the outer shaft 320 and change the rotation speed of the motor 800 at the reduction gear ratio so as to rotate the inner tub at a low speed and high torque.

In detail, the front end of the gear housing 210 may be located to be adjacent to the inner tub 1200 (refer to FIG. 2).

Also, a rear end of the gear housing 210 may be disposed to face a support 710.

Here, the support 710 refers to a support member which supports the electronic clutch 700.

As shown in FIG. 2, the support 710 is formed to extend and protrude from an insulator 811, which fixes the stator 810, toward a center of an inside, that is, a center in which the shaft 300 is located.

In other words, the stator 810 may be disposed along an edge of an accommodation space inside the frame 500, that is, an inner circumference of the frame 500 in a circumferential direction.

Here, the electronic clutch 700 is supported by a body, which fixes the stator 810, that is, the support 710 formed to extend from the insulator 811 such that an operation of the electronic clutch may be stably performed.

Meanwhile, the gear housing 210 in which the planetary gear 200 is built may also be connected to a stator-coupled part, which fixes the stator 810, that is, the insulator 811, such that a position thereof may be firmly fixed.

Next, an operational relationship of the driving device of the washing machine according to the embodiment of the present disclosure will be described.

In the driving device of the washing machine 1000 according to the embodiment of the present disclosure, the motor 800 (refer to FIG. 3) may rotate at the same rotation speed irrelevant to whether spin-drying or washing is being performed.

For example, the motor 800 may rotate at the same speed of 500 RPM. When the motor operates with maximum efficiency at a uniform rotation speed as described above, an advantage of reducing energy is present.

When the spin-drying operation of the washing machine is necessary, the on operation of the electronic clutch 700 (refer to FIG. 2) is selected. Accordingly, the inner tub 1200 (refer to FIG. 2) operates in the high speed and low torque operation mode at the speed of 500 RPM corresponding to the rotation speed of the motor. Efficiency of the spin-drying operation may be increased.

When the washing operation of the washing machine is necessary, the operation of the electronic clutch 700 is turned off. Accordingly, the inner tub 1200 is reduced in speed through the planetary gear 200 (refer to FIG. 2) and operates in the low speed and high torque operation mode. Efficiency of the washing operation may be increased.

As described above, the present disclosure has advantages of implementing a high speed and low torque operation mode when spin-drying and implementing a low speed and high torque operation mode when washing without a rotation speed of the motor being changed.

As described above, according to the driving device of the present disclosure, while an operation speed of a motor may be maintained at the same speed, a high speed and low torque operation mode and a low speed and high torque operation mode necessary for spin-drying and washing may be selectively implemented by on/off operations of an electronic clutch.

For example, when the electronic clutch is turned on, torque of the motor is directly connected to an inner tub such that the high speed and low torque operation mode may be available. As another example, when the electronic clutch is turned off, the torque of the motor is changed in speed at a preset reduction gear ratio through a planetary gear and then transmitted to the inner tub such that the low speed and high torque operation mode may be available.

Accordingly, although the operation speed of the motor is equal when washing and spin-drying, both operations necessary for washing and spin-drying, that is, a low speed and high torque operation and a high speed and low torque operation, may be satisfied by adjusting the on/off operations of the electronic clutch during washing and spin-drying. In addition, a large capacity of a washing machine is applicable due to an increase in torque caused by the reduction gear ratio.

As described above, since it is possible to increase efficiency of an operation area of the motor by maintaining a uniform rotation speed of the motor, electrical energy consumption may be reduced.

According to the present disclosure, while an operation speed of a motor may be maintained at the same speed, a high speed and low torque operation mode and a low speed and high torque operation mode necessary for spin-drying and washing may be selectively implemented by on/off operations of an electronic clutch.

For example, when the electronic clutch is turned on, torque of the motor is directly connected to an inner tub such that the high speed and low torque operation mode may be available. As another example, when the electronic clutch is turned off, the torque of the motor is changed in speed at a preset reduction gear ratio through a planetary gear and then transmitted to the inner tub such that the low speed and high torque operation mode may be available.

Accordingly, although the operation speed of the motor is equal when washing and spin-drying, both operations necessary for washing and spin-drying, that is, a low speed and high torque operation and a high speed and low torque operation, may be satisfied by adjusting the on/off operations of the electronic clutch during washing and spin-drying. In addition, a large capacity of a washing machine is applicable due to an increase in torque caused by the reduction gear ratio.

As described above, since it is possible to increase efficiency of an operation area of the motor by maintaining a uniform rotation speed of the motor, electrical energy consumption may be reduced.

In addition to the above effects, detailed effects of the present disclosure will be disclosed in the following detailed description for implementing the present disclosure.

Although the embodiments of the present disclosure have been described with reference to the drawings, it is apparent that the present disclosure is not limited to the embodiments disclosed in the specification and the drawings and a variety of modifications may be made by one of ordinary skill in the art within the scope of the technical concept of the present disclosure. In addition, even though operations and effects according to the components of the present disclosure are not described with explicit disclosure, predictable effects of corresponding components should be acknowledged.

What is claimed is:

1. A driving device of a washing machine, comprising:
   a motor comprising a stator and a rotor at least partially surrounded by the stator;
   a shaft coupled to the motor and configured to rotate an inner tub of the washing machine;
   a planetary gear connected to the shaft and configured to change a torque of the motor and adjust a rotation speed of the inner tub according to a preset reduction gear ratio; and
   an electronic clutch located between the shaft and the planetary gear and configured to selectively couple the shaft with the planetary gear based on an operation mode of the washing machine,
   wherein the planetary gear is located at a front end of the shaft,
   wherein the electronic clutch is configured to adjust gear connection and disconnection between the shaft and the planetary gear,
   wherein the front end of the shaft includes an inner shaft and an outer shaft,
   wherein the inner shaft is connected to the motor and rotates separately from the outer shaft, and the outer shaft is configured to be connected to the planetary gear,
   wherein the driving device further comprising a frame defining a space for mounting the motor,
   wherein the shaft extends through a center of the frame and is connected to the planetary gear,
   wherein the driving device further comprising:
      an insulator that mounts the stator;
      a support extending from the insulator toward the shaft, and supporting the electronic clutch;
      a sun gear coupled to the end of the shaft; and
      a gear housing receiving the planetary gear and the sun gear, wherein the planetary gear is gear-coupled to the sun gear coupled to the inner shaft in the gear housing,
   wherein an end of the gear housing is located to face the inner tub, and an opposite end of the gear housing is disposed to face the support,
   wherein the support protrudes from the insulator toward a center of the gear housing in which the shaft is located,
   wherein the stator is disposed along an edge of an accommodation space inside the frame in a circumferential direction, and
   wherein the electronic clutch is supported by the support that extends from the insulator.

2. The driving device of claim 1, wherein the shaft is configured, based on the electronic clutch being turned on, to be connected to the inner tub without the planetary gear being coupled with the shaft.

3. The driving device of claim 2, wherein the driving device is configured to operate based on the operation mode of the washing machine,
   wherein the operation mode includes:
      a high speed and low torque operation mode in which the inner tub rotates at a first rotational speed with a first torque; and
      a low speed and high torque operation mode in which the inner tub rotates at a second rotational speed with a second torque, the second rotational speed lower than the first rotational speed, and the second torque higher than the first torque, and
   wherein the inner tub is configured, based on the electronic clutch being turned on, to operate in the high speed and low torque operation mode based on a rotation speed of the motor.

4. The driving device of claim 1, wherein the shaft is configured, based on the electronic clutch being turned off, to be connected to the planetary gear.

5. The driving device of claim 4, wherein the driving device is configured to operate based on the operation mode of the washing machine,
   wherein the operation mode includes:
      a high speed and low torque operation mode in which the inner tub rotates at a first rotational speed with a first torque; and
      a low speed and high torque operation mode in which the inner tub rotates at a second rotational speed with a second torque, the second rotational speed lower than the first rotational speed, and the second torque higher than the first torque, and
   wherein the inner tub is configured, based on the electronic clutch being turned off, to operate in the low speed and high torque operation mode based on a rotation speed of the motor changed with the preset reduction gear ratio of the planetary gear.

6. A driving device of a washing machine, comprising:
   a motor comprising a stator and a rotor at least partially surrounded by the stator;
   a shaft coupled to the motor and configured to rotate an inner tub of the washing machine;
   a planetary gear connected to the shaft and configured to change a torque of the motor and adjust a rotation speed of the inner tub according to a preset reduction gear ratio; and
   an electronic clutch configured to selectively couple the shaft with the planetary gear based on an operation mode of the washing machine,
   wherein the planetary gear is located at a front end of the shaft,
   wherein the electronic clutch is configured to adjust gear connection and disconnection between the shaft and the planetary gear,
   wherein the front end of the shaft includes an inner shaft and an outer shaft,
   wherein the inner shaft is connected to the motor and rotates separately from the outer shaft, and the outer shaft is configured to be connected to the planetary gear,
   wherein the driving device further comprising a frame defining a space for mounting the motor,
   wherein the shaft extends through a center of the frame and is connected to the planetary gear, wherein the driving device further comprising:
  an insulator that mounts the stator;
  a support extending from the insulator toward the shaft, and supporting the electronic clutch;
  a sun gear coupled to the end of the shaft; and
  a gear housing receiving the planetary gear and the sun gear, wherein the planetary gear is gear-coupled to the sun gear coupled to the inner shaft in the gear housing,
wherein an end of the gear housing is located to face the inner tub, and an opposite end of the gear housing is disposed to face the support,
wherein the support protrudes from the insulator toward a center of the gear housing in which the shaft is located,
wherein the stator is disposed along an edge of an accommodation space inside the frame in a circumferential direction,
wherein the electronic clutch is supported by the support that extends from the insulator,
wherein the operation mode includes:
  a high speed and low torque operation mode in which the inner tub rotates at a first rotational speed with a first torque, and
  a low speed and high torque operation mode in which the inner tub rotates at a second rotational speed with a second torque, the second rotational speed lower than the first rotational speed, and the second torque higher than the first torque, and
wherein the electronic clutch is selectively turned on or off to operate the high speed and low torque operation mode or the low speed and high torque operation mode based on the motor rotating at a constant speed.

7. The driving device of claim 6, wherein the shaft is configured, based on the electronic clutch being turned on, to be connected to the inner tub without the planetary gear being coupled between the shaft and the inner tub, such that the inner tub operates in the high speed and low torque operation mode corresponding to a rotation speed of the motor.

8. The driving device of claim 6, wherein the shaft is configured, based on the electronic clutch being turned off, to be connected to the planetary gear, such that the inner tub operates in the low speed and high torque operation mode based on a rotation speed of the motor changed with the preset reduction gear ratio through the planetary gear.

* * * * *